BERNARD McCONNELL.
Combination of a Heating-Furnace and a Cooking-Stove.
No. 127,082. Patented May 21, 1872.

WITNESSES
John Parker
J. B. Harding

Bernard McConnell
by his Atty.
Howson and Son

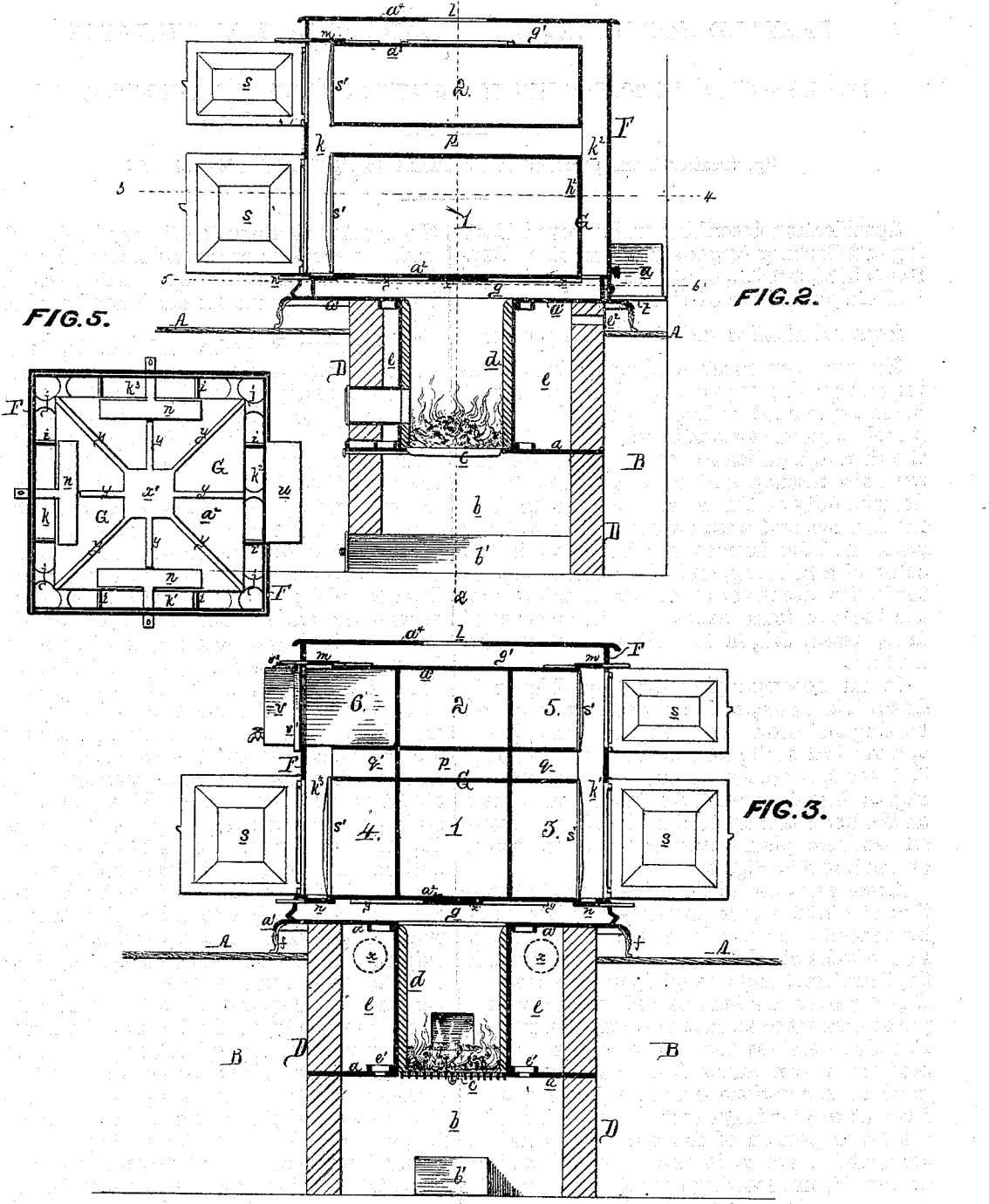

127,082

UNITED STATES PATENT OFFICE.

BERNARD McCONNELL, OF PHILADELPHIA, PENNSYLVANIA.

IMPROVEMENT IN THE COMBINATION OF A HEATING-FURNACE AND A COOKING-STOVE.

Specification forming part of Letters Patent No. 127,082, dated May 21, 1872.

Specification describing an Improved Heating and Cooking Apparatus, invented by BERNARD MCCONNELL, of the city and county of Philadelphia, State of Pennsylvania.

*Improved Heating and Cooking Apparatus.*

My invention consists of a combined heating and cooking apparatus, too fully explained hereafter to need preliminary description, the principal advantageous features of which are the thorough utilization of the heat generated for both heating and cooking purposes, the detachability of the cooking apparatus from the furnace, and such an arrangement of the parts that the furnace can be placed in the cellar of a building, and the cooking apparatus in the kitchen or other apartment above, the inconvenience caused by the presence of dust, ashes, &c., in the kitchen being thus avoided.

Figure 4:
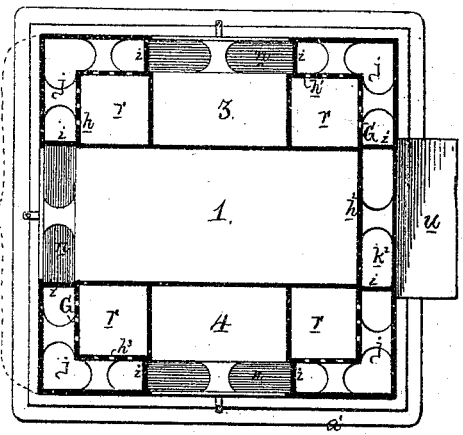
Figure 1:
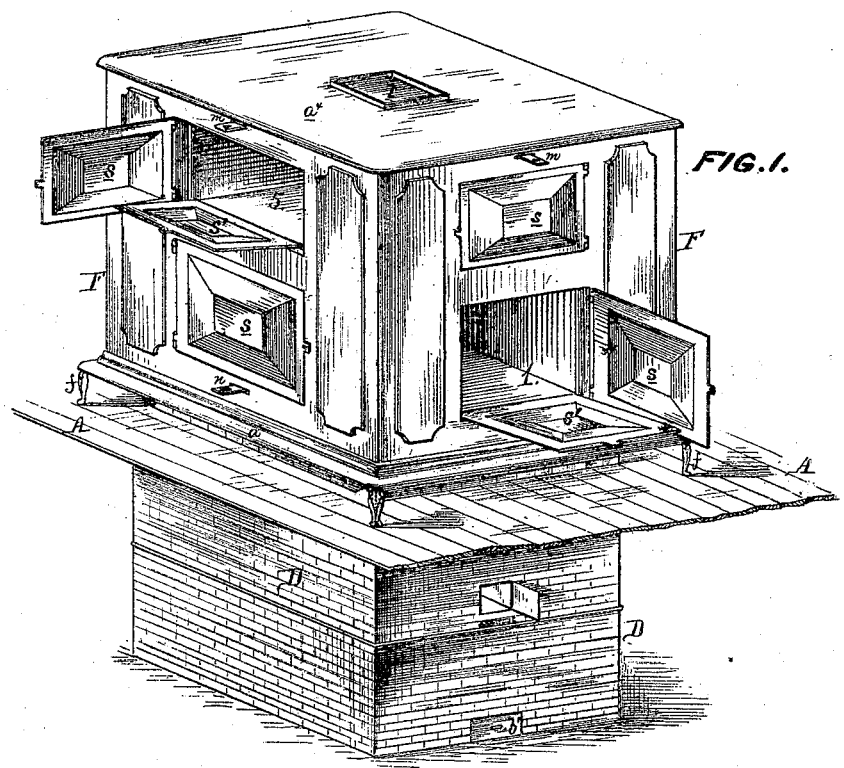

In the accompanying drawing, Figure 1, Sheet 1, is a perspective view of my improved heating and cooking apparatus; Fig. 2, Sheet 2, a vertical sectional view of the same; Fig. 3, Sheet 2, a vertical section on the line 1 2, Fig. 2; Fig. 4, Sheet 1, a sectional plan view on the line 3 4, Fig. 2; and Fig. 5, an inverted sectional plan, drawn to a reduced scale, on the line 5 6, Fig. 2.

A represents one of the floors of a building—that of a kitchen, for instance—and B the cellar beneath. In the latter is built a furnace, D, the walls of which extend upward through the floor A and project slightly above the same. Directly over this furnace and within the upper apartment or kitchen is arranged a casing, F, which receives the whole of the heated products of combustion from the furnace, and in which are various ovens and passages or flues, as will be fully described hereafter. In the lower portion of the furnace beneath a horizontal plate, $a$, is the ash-pit $b$ and a drawer, $b'$, for receiving the ashes as they fall from the grate $c$, the latter being on line with the plate $a$, and at the base of the fire-pot or cylinder $d$, which is contained entirely within the furnace between the said plate $a$ and a plate, $a^1$, and is surrounded by a hot-air chamber, $e$. The latter is supplied with cold air through apertures $e^1$ in the plate $a$, (see Fig. 3,) and discharges its heated air through an opening, $e^2$, covered by a register, directly into the apartment above, or it may be furnished with the usual pipes $x$ $x$, as indicated by dotted lines in Fig. 3, through which to conduct the heated air to remote portions of the building.

The casing F, before referred to, is supported partly by the plate $a^1$ which forms its base, and partly by feet $f$, with which it is provided, and the said casing is not secured to the furnace, but can be lifted from the same when desired, as hereafter described. The entire lower portion of the casing between the plates $a^1$, and a plate, $a^2$, at a short distance above the same, is occupied by a chamber, $g$, into which the heated products of combustion from the furnace can at all times pass freely. (See Figs. 2 and 3.) The plate $a^2$ forms the bottom of an interior and smaller casing, G, contained entirely within the casing F, the four sides of the said interior casing being represented by the letters $h$, $h^1$, $h^2$, and $h^3$, and the top of the same consisting of a plate, $a^3$, between which and the top $a^4$ of the outer casing intervenes a narrow chamber, $g'$. The space between the sides of the inner and outer casings is separated by vertical partitions $i$, Figs. 4 and 5, into eight passages or flues, $j j j j$ and $k$, $k^1$, $k^2$, and $k^3$. The corner passages $j$ are open at top and bottom, and form at all times a free communication for the products of combustion from the chamber $g$ to the chamber $g'$ in their upward passage to the outlet $l$, and thence to the chimney. The four side passages $k$, $k^1$, &c., may also form flues for the products of combustion; but they are all, with the exception of the passage $k^2$, at the back of the apparatus, provided, at top and bottom, with sliding dampers $m$ and $n$, by means of which all communication between the said passages and the chambers $g$ and $g'$ can be shut off. (See Figs. 2, 3, and 5.) On the under side of the plate $a^2$ and directly above the furnace is a projection, $x'$, from which radiate ribs $y$, in the manner plainly shown in Fig. 5, the said radial ribs serving the twofold purpose of directing the products of combustion to the several passages or flues $j$ and $k$, and of strengthening and preventing the warping of the plate, owing to the great heat to which it is subjected. The interior of the inner casing G is separated by vertical and horizontal partitions into six chambers or ovens, 1, 2, 3, 4, 5, and 6, the two former of which are arranged one above the other, extend entirely across the casing, and are separated by a flue, $p$, which communicates, at its opposite ends, with the passages $k$ and $k^2$, Figs. 2, 3, and 4. The ovens 3, 4, 5, and 6 are considerably smaller than the ovens 1 and 2, and are arranged upon each side of the latter, in the manner best observed in Fig. 3, a flue, $q$, communicating with the passage $k^1$ intervening between the ovens 3 and 5, and a flue, $q'$, communicating with the passage $k^3$ between the ovens 4 and 6. The corner spaces $r$, Fig. 4, formed between the walls $h$ of the inner casing and the sides of the ovens are closed at top and bottom by the plates $a^3$ and $a^4$, but are perforated at the sides, so as to communicate freely with the passages $j$, thus permitting currents of heated air to enter, circulate within, and pass from the said spaces.

In the outer casing F, at a point opposite the front or open end of each oven, is an opening of the same size as the latter, closed by a door, $s$, hinged at the side, and having lap flanges, so as to form a tight joint, and thus prevent the escape of gas or products of combustion from the flues $k$ $k^1$ and $k^3$ into the kitchen or other apartment. As the said ovens communicate at their open front ends with the flues $k$ $k^1$ and $k^3$ it is necessary to provide them also with close-fitting doors $s'$, in order to prevent gas from entering the ovens. These latter doors are hinged at the bottom, as best observed in Fig. 1, so that they can be lowered and extended outward through the openings in the outer casing, when the doors $s$ are opened, thus providing a convenient shelf upon which to rest the cooking utensils in putting them into or taking them out of the ovens. At the back and close to the bottom of the outer casing F is a bracket, $t$, upon which rests or to which is secured a boiler, $u$, the latter being provided with pipes as usual for supplying it with cold water, and for conducting off the heated water to the points at which it is to be used. A water-heater or boiler, $v$, Fig. 3, is also fitted into one of the upper ovens, and has a lap flange, $v'$, so as to form a tight joint, and thus prevent the escape of gas from the flues. This boiler has an outlet-cock at the bottom through which the water can be drawn off as required for use, and it has a hinged lid at the top, after lifting which the said boiler may be filled by means of a hose or pipe connected to the lower boiler $u$. The hinged lid also acts as a safety-valve and prevents any dangerous accumulation of steam in the boiler. If desired, any of the remaining ovens, as well as the oven 6, may be provided with a boiler, $v$.

When all of the ovens are in use the whole of the dampers $m$ and $n$ are pushed in or opened, so that the heated products of combustion after entering the chamber $g$ at the bottom of the ovens, may rise through the whole of the vertical flues $j$ and $k$ at the front and back of the said ovens, circulate between the latter in the flues $p$ $q$ and $q^1$, and finally pass over the top of the same through the chamber $g'$ in passing to the outlet $l$. The ovens being thus entirely surrounded by flues become quickly and uniformly heated, and the whole number can be in use at one time. If it be desired, however, to direct the whole volume of heat to any particular oven or ovens, one or more of the flues $k$ may be shut off by a proper manipulation of the dampers $m$ and $n$.

Whenever it is desired to obtain access to the interior of any of the ovens, it will also be necessary to shut off and prevent the passage of the products of combustion through the flue at the front of such ovens. For instance, if it is desired to open the ovens 1 and 2, Fig. 2, the dampers $m$ and $n$ of the flue $k$ are first closed, after which the doors $s$ and $s'$ may be opened without risk of permitting gas to pass into the room.

Among the advantages of my invention may be mentioned that space is economized in the kitchen, as the upper casings only, which form the cooking apparatus, are contained therein, while the furnace is arranged in the cellar beneath, and the dust, ashes, &c., being confined to the cellar the kitchen can be kept in a much more cleanly condition than is possible when ordinary stoves or ranges are employed. Another advantage is that the ordinary heating-furnace is utilized for cooking purposes, without interfering with its usual duty of heating remote portions of the building, and as the whole body of the heated products of combustion is caused to pass upward through the said cooking apparatus, it can, where a large furnace is employed, be further utilized either in radiators or in other similar cooking apparatus, arranged above the first, before being permitted to escape to the chimney.

The casing F is made detachable from the furnace so that in the summer season it can be removed therefrom and be transferred to an outer kitchen or yard, where it can be fitted to any furnace or stove, which is of sufficiently large size at the top to receive it, the furnace D, when the casing is thus removed, being closed at the top by any suitable covering.

I claim as my invention—

1. The casing G, with its ovens arranged within the outer casing F, substantially in the manner described, so as to form communicating chambers and flues $g$ $g'$ $j$ $k$ $p$ and $q$ at all sides of the said ovens, as specified.

2. The combination, with the flues $k$ $k^1$ and $k^3$ at the fronts of the ovens, of dampers $m$ and $n$, for the purpose specified.

3. The combination, with each of the ovens, of two doors, $s$ and $s'$, in the walls of the outer and inner casings F and G.

4. The said doors $s$ and $s'$, hinged at the side and bottom, and arranged to be opened and closed in respect to each other, substantially in the manner described.

5. The hot-air chambers $r$ communicating with the flues $j$ through perforations in the walls of the casing G.

6. The boiler $v$ adapted to one of the ovens, and provided with an outlet-cock and with an opening at the top through which it can be filled by means of a hose or pipe from the fixed boiler $u$, all substantially as specified.

7. The plate $a^2$ at the bottom of the casing G and directly over the fire, when cast with radial ribs $y$, for the purpose specified.

In testimony whereof, I have signed my name to this specification, in the presence of two subscribing witnesses.

BERNARD McCONNELL.

Witnesses:
    HARRY W. DOUTY,
    JOHN K. RUPERTUS.